Figure 1:
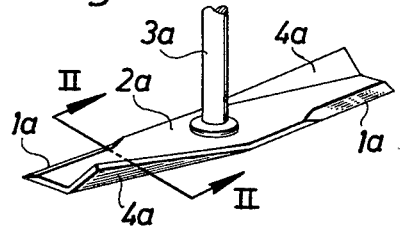

United States Patent [19]

Lindblad

[11] 4,214,426
[45] Jul. 29, 1980

[54] NOISE DAMPING ARRANGEMENT IN ROTATING CUTTING DEVICES

[75] Inventor: Sture V. Lindblad, Stockholm, Sweden

[73] Assignee: Stiga AB, Tranås, Sweden

[21] Appl. No.: 869,054

[22] Filed: Jan. 13, 1978

[30] Foreign Application Priority Data

Jan. 18, 1977 [SE] Sweden ............................. 7700499

[51] Int. Cl.² ........................................... A01D 55/18
[52] U.S. Cl. ....................................... 56/295; 56/17.5
[58] Field of Search ................................. 56/295, 17.5

[56] References Cited

U.S. PATENT DOCUMENTS

| | | | |
|---|---|---|---|
| 2,484,511 | 10/1949 | Ingalls | 56/295 |
| 2,908,128 | 10/1959 | Mauro | 56/295 |
| 3,035,359 | 5/1962 | Ewert | 56/295 |
| 3,078,573 | 2/1963 | Kern | 56/295 |
| 3,080,697 | 3/1963 | Mauro | 56/295 |
| 3,191,371 | 6/1965 | Brewer | 56/295 |
| 3,320,733 | 5/1967 | Kirk | 56/295 |
| 3,327,460 | 6/1967 | Blackstone | 56/295 |
| 3,690,051 | 9/1972 | Wood | 56/295 |
| 3,717,985 | 2/1973 | Freelander et al. | 56/295 |

FOREIGN PATENT DOCUMENTS 2014251 10/1970 Fed. Rep. of Germany ............. 56/295

Primary Examiner—Louis G. Mancene
Assistant Examiner—Paul J. Hirsch
Attorney, Agent, or Firm—Blanchard, Flynn, Thiel, Boutell & Tanis

[57] ABSTRACT

A rotary cutting device, primarily for grass mowers, includes a number of blade elements for cutting or air propelling purposes. To reduce noise, the rotating blades are provided with substantially flat leading and trailing edge portions formed along a major part of the leading edge and trailing edge, respectively, of the blade, cross sections of the leading edge flat portion being parallel to corresponding cross sections of the trailing edge flat portion and being connected thereto by an intermediate portion merging by smooth roundings into the respective flat portions, the cross sections being in respective cutting planes parallel to the axis of rotation and perpendicular to the longitudinal direction of the blade, such that the airflow past the blade follows the blade smoothly and shedded vortices are limited substantially to a relatively small cross-sectional area immediately following the trailing edge of the blade.

4 Claims, 6 Drawing Figures

U.S. Patent   Jul. 29, 1980   4,214,426

NOISE DAMPING ARRANGEMENT IN ROTATING CUTTING DEVICES

This invention relates to rotating cutting devices comprising rotating knives and/or fan blades, more particularly devices intended for mowing grass.

In known devices for rotary type motor lawn mowers a cutting blade device rotates at high speed substantially in a horizontal plane about a vertical shaft. It is known to form a knife or cutting blade from an elongated, narrow strip as well as to adopt such a blade for various purposes by forming the blade with portions bent upwardly and/or downwardly, the blade possibly being divided into separate portions by cuts or slots as suggested in for example the U.S. Pat. No. 3,080,697. It is also known to form a cutting blade with an upper surface, bent upwardly or formed concave to induce a fan effect in order to bring about an air current raising the grass so as to make it easier to cut or mow.

It is also known to bring about such a fan effect by arranging separate fan blades coacting with one or more rotating cutting blades which may be made integral from end to end or composed by shorter knives, preferably hinged to the edge of a rotating central member, which has the form of a spider, a circular plate etc. and is fixed to the rotary shaft. The central member may be made up of a substantially flat disc or arm supporting the cutting blade or blades. The central member may have a separate fan blower or be provided with fan blade portions bent upwardly or offset from the disc or arm. Such portions generally have the same bent form as previously described with respect to the cutting blades. The desired effect—a fan effect to raise the grass—is thus achieved by bending the cutting blades, by arranging separate fan blades or by a combination of both.

However, in using rotating cutting and fan blades of said type at high speeds, existing sharp edges, cuts and offset portions will cause a very high sound level, i.e. an inconvenient noise. This noise has proved to be the origin of a very great part of the total noise from a motor lawn mower, especially electric motor mowers, as electric motors run much more silently than petrol engines. In connection with the present great interest in environmental matters and environmental protection, laws and regulations have been introduced which have heavily increased the demands for a low noise level.

It is therefore an object of this invention to reduce considerably the inconvenient noise of cutting or mowing devices having rotating cutting and fan blades, in particular where such devices are used in grass mowing machines. According to the invention this object is achieved in a surprisingly simple, very efficient way and at practically no extra costs.

The invention will now be described with reference to the drawing in which

Figure 2:
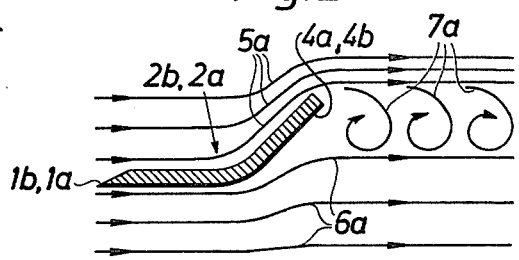
Figure 3:
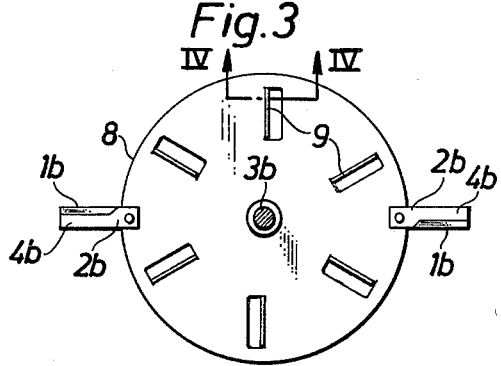
Figure 4:
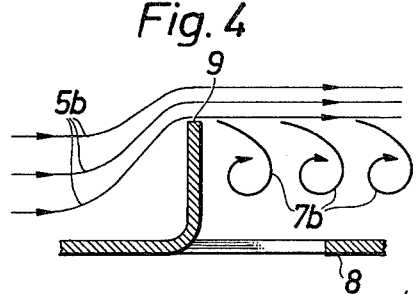

FIG. 1 is a known cutting/mowing device with a rotating cutting blade having a concave upper surface, FIG. 2 is a sectional view of the outer part of the cutting blade as taken on the line II—II of FIG. 1 with air current lines indicated, FIG. 3 is a plan view of a known cutting and fan blade device having a central member FIG. 4 is a sectional view of the fan blade as taken on the line IV—IV of FIG. 3

Figure 5:
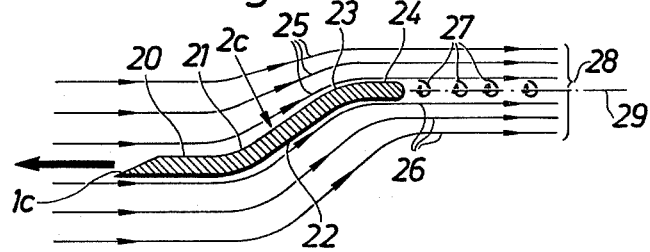
Figure 6:
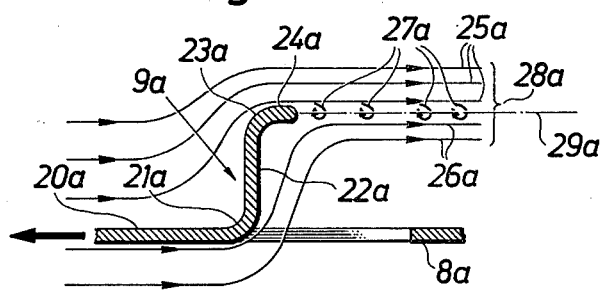

FIG. 5 is a sectional view of a cutting blade according to the invention, shown in the same way as the cutting blade of FIG. 2 and finally, FIG. 6 is a sectional view of a fan balde according to the invention, shown in the same way as the fan blade of FIG. 4.

In FIG. 1, 1a is the sharp edge part of a cutting blade 2a in the form of a flat strip having diagonally opposite corners curved upwardly to form fan blades. The body of the cutting blade rotates at its center on a shaft 3a.

FIG. 2 is a sectional view of the outer part of the cutting blade 2a, having a concave upper surface, a leading sharp edge 1a and an upwardly curved trailing part 4a. The lines 5a and 6a shows the air current flow lines along the upper side and the lower side respectivly of the cutting blade. As the blade rotates at high speed at its ends, whirls or vortices 7a are induced behind the outer, rear portions of the knife, said vortices being intermittently broken away or shedded from the trailing edge of the knife 2a. This causes a heavy noise when operating the grass mower.

FIG. 3 shows a cutting and fan blade device having a circular disc 8 of steel sheet provided with fan blades 9 being bent upwardly. The knife or cutting blades 2b are hinged to the edge of the disc 8. The cross section of the outer portion of the cutting blade 2b has the same shape as shown in FIG. 2. From a noise point of view these cutting blades 2b have the same disadvantages as previously described.

FIG. 4 illustrates a sectional view of a fan blade 9 bent upwardly from the disc 8 and with air current flow lines 5b along its upper surface. Also when such a fan blade rotates vortices 7b are induced which will be intermittently shedded from the trailing edge of the blade and cause a heavy noise in the same way as described with respect to the cutting blade.

In the same way as in FIG. 2, FIG. 5 illustrates a sectional view of the outer portion of a cutting blade which, however, is formed according to the invention. The blade is moving in the direction of the arrow and has a leading cutting edge 1c. From this edge onwards the upper surface of the blade has a portion 21 of concave shape followed by a portion 23 of convex shape. Thus the cutting blade 2c has at its leading edge a flat portion 20 whereas the blade at its trailing edge has a flat portion 24 offset in relation to the leading flat portion, said two portions being so oriented that they exhibit substantially parallel sections in planes parallel to the rotational shaft of the rotor and substantially perpendicular to the longitudinal direction of the cutting blade 2c, whereas the two portions are joined by means of an intermediate portion 22 which by the smooth roundings 21 and 23 merge into the respective end portion.

The outermost trailing flat portion 24 of the cutting blade is thus substantially contained in the plane 29 of rotation which is a part of the surface of revolution generated about the shaft by the trailing edge of the cutting blade. By this it is achieved that the air current 25, 26 when leaving the cutting blade 2c at 28, has mainly the same direction as the trailing flat portion 24. This means that shedded vortices 27 are only induced immediately behind the very edge of the cutting blade 2c. As these vortices 27 have a very restricted extension the resulting noise level will be very low.

FIG. 6 illustrates in the same way as in FIG. 5 a sectional view of the outer portion of a rotating fan blade 9a formed according to the invention and whose upper surface has a portion 21a of concave shape followed by a portion 23a of convex shape. Thus the fan blade 9a has at its leading edge a flat portion 20a whereas the blade at its trailing edge has a flat portion 24a offset in relation to the leading flat portion, said two portions being so oriented that they exhibit substantially parallel sections in planes parallel to the rotational shaft of the rotor and substantially perpendicular to the longitudinal direction of the fan blade 9a, whereas the two portions are joined by means of an intermediate portion 22a which by smooth roundings 21a and 23a merges into the respective end portion.

The outermost trailing flat portion 24a of the fan blade is thus substantially contained in the plane 29a of rotation, which is a part of the surface of revolution generated about the shaft by the trailing edge of the fan blade 9a. In the same way as described above with respect to the cutting blade the air current is leaving the trailing flat portion 24a of the fan blade in the direction of this portion. In doing so only very small shedded vortices 27a are induced immediately behind the outer edge of the fan blade resulting in a very low noise level.

As mentioned in the introduction of this specification the greater part of the total noise from a motor lawn mower is caused by the rotating assembly of fan and/or cutting blades. According to the invention the noise is considerably reduced. In practical tests it has been found that in a medium size rotating device according to the invention, containing cutting as well as fan blades, the noise level was decreased by about 8 dB(A), which is a very remarkable decrease of the noise level.

It is readily understood that the suggested shape of cutting and fan blades does not bring with it any noticeably higher costs, as the amount of material is the same and the tools necessary for the manufacture of the blades will be only slightly more expensive. By the invention a considerably lower noise level has been achieved without any appreciable cost.

To further reduce the shedding of vortices at the trailing edge of the cutting or fan blades—and thus also further reduce the noise level—the trailing edge may be rounded off or chamfered, which is also achieved without any appreciable cost.

The above description relates to one embodiment of the invention in which noise caused by rotating cutting or fan blades in rotating cutting devices is considerably reduced. It is readily understood that the invention also is applicable to other rotating, protruding portions of a rotating device as well as to the use of several rotating cutting devices within one and the same assembly or unit. It is to be realized that this embodiment of the invention is presented by way of example and that alterations are permissible without departing from the spirit and scope of the invention as defined in the following claims.

I claim:

1. A rotary cutting device, usable in grass mowers and the like of the type having a rotational shaft, comprising a rotary member, which is substantially flat and rigidly secured to said rotational shaft at right angles to the axis of rotation thereof, said rotary member including a plurality of active elements, each active element having the form of an elongated blade substantially rectangular in plan, the longer sides of the blade forming leading and trailing edges of the blade during rotation;

each blade having means for damping noise, said noise damping means comprising a substantially flat leading portion formed along the major outer end part of the leading edge of the blade and a substantially flat trailing portion formed along the opposed major outer end part of the trailing edge of the blade, cross sections of said leading edge flat portion being parallel to and offset below corresponding cross sections of said trailing edge flat portion and being interconnected by an inclined intermediate portion merging by smooth roundings into the respective flat portions, said cross sections being in respective cross-sectional planes parallel to the axis of rotation and perpendicular to the longitudinal direction of said blade, said leading and trailing edges being continuous and unbroken, said leading edge forming only a single cutting edge, said single cutting edge leading at least a substantial length of said flat leading portion, the said trailing edge at said flat trailing portion of said blade being rounded for facilitating release, without disturbing turbulence, from said edge of air flowing past said blade, said trailing edge portion cross sections being relatively short in cross section as compared to the corresponding cross sections of said intermediate portion at least toward the radially outer end of said intermediate portion.

2. A rotary cutting device, usable in grass mowers and the like of the type having a rotational shaft, comprising a rotary member, which is substantially flat and rigidly secured to said rotational shaft at right angles to the axis of rotation thereof, said rotary member including a plurality of active elements, each active element having the form of an elongated blade substantially rectangular in plan, the longer sides of the blade forming leading and trailing edges of the blade during rotation;

each blade having means for damping noise, said noise damping means comprising a substantially flat leading portion formed along the major outer end part of the leading edge of the blade and a substantially flat trailing portion formed along the opposed major outer end part of the trailing edge of the blade, cross sections of said leading edge flat portion being parallel to and offset below corresponding cross sections of said trailing edge flat portion and being interconnected by an inclined intermediate portion merging by smooth roundings into the respective flat portions, said cross sections being in respective cross-sectional planes parallel to the axis of rotation and perpendicular to the longitudinal direction of said blade, said leading and trailing edges being continuous and unbroken, said leading edge forming only a single cutting edge, said single cutting edge leading at least a substantial length of said flat leading portion, the said trailing edge at said flat trailing portion of said blade being rounded for facilitating release, without disturbing turbulence, from said edge of air flowing past said blade, said trailing edge portion cross sections being relatively short in cross section as compared to the corresponding cross sections of said intermediate portion at least toward the radially outer end of said intermediate portion, said inclined intermediate portion of said blade being wedge-shaped, being wider at the radially outer end of said blade and being reduced in circumferential width toward the radially inner portion of the blade, such that corresponding cross sections of said flat leading portion and flat trailing portion are connected by cross sections of said intermediate portion diminishing in length in cross-sectional planes successively closer to the radially inner portion of said blade.

3. A rotary cutting device, usable in grass mowers and the like of the type having a rotational shaft, comprising a rotary member, which is substantially flat and rigidly secured to said rotational shaft at right angles to the axis of rotation thereof, said rotary member including a plurality of active elements, each active element having the form of an elongated blade substantially rectangular in plan, the longer sides of the blade forming leading and trailing edges of the blade during rotation;

each blade having means for damping noise, said noise damping means comprising a substantially flat leading portion formed along the major outer end part of the leading edge of the blade and a substantially flat trailing portion formed along the opposed major outer end part of the trailing edge of the blade, cross sections of said leading edge flat portion being parallel to and offset below corresponding cross sections of said trailing edge flat portion and being interconnected by an inclined intermediate portion merging by smooth roundings into the respective flat portions, said cross sections being in respective cross-sectional planes parallel to the axis of rotation and perpendicular to the longitudinal direction of said blade, said leading and trailing edges being continuous and unbroken, said leading edge forming only a single cutting edge, said single cutting edge leading at least a substantial length of said flat leading portion, the said trailing edge at said flat trailing portion of said blade being rounded for facilitating release, without disturbing turbulence, from said edge of air flowing past said blade, said trailing edge portion cross sections being relatively short in cross section as compared to the corresponding cross sections of said intermediate portion at least toward the radially outer end of said intermediate portion, said blade having its radially inner end pivotally mounted on a rotatable disk adjacent the periphery of the latter and having its cutting edge extending beyond said disk, said rotatable disk being said rotary member.

4. The apparatus of claim 3, including fan blades having intermediate portions upstanding from the surface of said disk and a slot trailing said fan blade intermediate portion, the upper edge of said fan blade intermediate portion having a trailing flat portion fixed thereon, and including smooth roundings merging said intermediate portion into said flat trailing portion and disk.

* * * * *